(12) United States Patent
Liboiron-Ladouceur et al.

(10) Patent No.: US 9,917,650 B2
(45) Date of Patent: Mar. 13, 2018

(54) TIME SAMPLED PHOTODETECTOR DEVICES AND METHODS

(71) Applicant: THE ROYAL INSTITUTION FOR THE ADVANCEMENT OF LEARNING/MCGILL UNIVERSITY, Montreal (CA)

(72) Inventors: Odile Liboiron-Ladouceur, Montreal-Ouest (CA); Md. Shafiqul Hai, Kingston (CA); Michael Menard, Verdun (CA)

(73) Assignees: TRANSFERT PLUS, SOCIÉTÉ EN COMMANDITE, Montreal (CA); THE ROYAL INSTITUTION FOR THE ADVANCEMENT OF LEARNING/ MCGILL UNIVERSITY, Montreal (CA)

( * ) Notice: Subject to any disclaimer, the term of this patent is extended or adjusted under 35 U.S.C. 154(b) by 39 days.

(21) Appl. No.: 15/248,582

(22) Filed: Aug. 26, 2016

(65) Prior Publication Data
US 2017/0093499 A1 Mar. 30, 2017

Related U.S. Application Data

(60) Provisional application No. 62/232,645, filed on Sep. 25, 2015.

(51) Int. Cl.
*H04B 10/60* (2013.01)
*G01J 1/44* (2006.01)

(52) U.S. Cl.
CPC ............... *H04B 10/60* (2013.01); *G01J 1/44* (2013.01)

(58) Field of Classification Search
CPC .................................. G01J 1/44; H04B 10/60
See application file for complete search history.

(56) References Cited

U.S. PATENT DOCUMENTS 4,182,935 A * 1/1980 Chown ................. G01D 5/268
    385/15
4,743,113 A * 5/1988 Jubinski ................ G01H 9/004
    250/227.19

(Continued)

OTHER PUBLICATIONS

Xu et al., "Reconfigurable Optical Directed-Logic Circuits using Microresonator-based Optical Switches", Optical Society of America, Mar. 2011, OSA Optics Express vol. 19, No. 6, pp. 5244-5259.

(Continued)

*Primary Examiner* — Danny Leung
(74) *Attorney, Agent, or Firm* — Norton Rose Fulbright Canada LLP; Alexandre Daoust

(57) ABSTRACT

Photonic integration has primarily sought to exploit optical parallelism through wavelength division multiplexing whilst in many instances "brute-force" time division multiplexing offers benefits through reduced complexity and cost. However, photoreceivers are primarily the same now for operation at 10 Gb/s, 20 Gb/s, 40 Gb/s and above as 20 or 25 years ago and exploit the same optical detection—amplification— logic processing design. However, high speed low cost electronics ca be leveraged in conjunction with optical time sampling and logic to provide a new design paradigm. An incoming $XGbs^{-1}$ optical data stream is sampled and processed by N photodetectors each operating at $(X/N)Gbs^{-1}$ rather than the current direct $XGbs^{-1}$ front-end of the prior art. Flexibility for the designer in establishing N within optical layer constraints, electronics capabilities etc. allows for further cost—power—complexity—performance tradeoffs to be established in different systems such that high capacity TDM links can exploit direct CMOS integrated optoelectronic front-ends.

18 Claims, 13 Drawing Sheets

(56) References Cited

U.S. PATENT DOCUMENTS

| | | | | |
|---|---|---|---|---|
| 4,959,540 | A * | 9/1990 | Fan | G02B 6/2861 250/227.12 |
| 5,331,452 | A * | 7/1994 | Smyth | H04B 10/67 250/227.14 |
| 5,418,360 | A * | 5/1995 | Sokolowska | G02B 6/2861 250/227.12 |
| 2007/0024857 | A1* | 2/2007 | Menezo | G01D 5/266 356/478 |
| 2007/0065070 | A1* | 3/2007 | Berger | G01N 21/7703 385/12 |
| 2010/0302549 | A1* | 12/2010 | Menezo | G01D 5/35303 356/478 |
| 2015/0053870 | A1* | 2/2015 | Rumyantsev | G01N 21/6458 250/459.1 |
| 2017/0093499 | A1* | 3/2017 | Liboiron-Ladouceur | H04B 10/60 |

OTHER PUBLICATIONS

L. Yang et al., "On-Chip CMOS-Compatible Optical Signal Processor", Optical Society of America, Jun. 2012, OSA Optics Express, vol. 20, No. 12, pp. 13560-13565.

Yin et al., "31 GHz Ge n-i-p Waveguide Photodetectors on Silicon-on-Insulator Substrate", Optical Society of America, Oct. 2007, OSA Optics Express, vol. 15, No. 21, pp. 13965-13971.

Pan et al., "High-Speed Receiver based on Waveguide Germanium Photodetector Wire-Bonded to 90nm SOI CMOS Amplifier", Optical Society of America, Jul. 2012, OSA Optics Express, vol. 20, No. 16, pp. 18145-18155.

Assefa et al., "A 90nm CMOS Integrated Nano-Photonics Technology for 25Gbps WDM Optical Communication Applications", Institute of Electrical and Electronic Engineers, 2012, Proc. IEEE Int. Electron Devices Meeting (IEDM), vol. 33, Paper 33-8.

Novack et al., "Germanium Photodetector with 60 GHz Bandwidth using Inductive Gain Peaking", Optical Society of America, Nov. 2013, OSA Optics Express, vol. 21, No. 23, pp. 28387-28393.

Nazari et al., "A 24 Gb/s Double Sampling Receiver for Ultra-Low-Power Optical Communication", Institute of Electrical and Electronic Engineers, Feb. 2013, IEEE J. Solid State Circuits, vol. 48, No. 2, pp. 344-357.

Luo et al., "Silicon-based Traveling-Wave Photodetector Array (Si-TWPDA) with Parallel Optical Feeding", Optical Society of America, Aug. 2014, OSA Optics Express, vol. 22, No. 17, pp. 20020-20026.

Abiri et al., "A Self-Equalizing Photo Detector," Institute of Electrical and Electronic Engineers, Dec. 2014, Proc. IEEE Integrated Photonics Conference, pp. 196-197.

Doerr et al., "Monolithic Polarization and Phase Diversity Coherent Receiver in Silicon", Institute of Electrical and Electronic Engineers, Feb. 2010, J. Lightwave Technology, vol. 28, No. 4, pp. 520-525.

Hai et al., "A 16 GHz Silicon-based Monolithic Balanced Photodetector with On-Chip Capacitors for 25 Gbaud Front-End Receivers", Optical Society of America, Dec. 2013, Optics Express, vol. 21, No. 26, pp. 32680-32689.

Li et al. "Ultralow-Loss, High-Density SOI Optical Waveguide Routing for Macrochip Interconnects", Optical Society of America, May 2012, Optics Express, vol. 20, No. 11, pp. 12035-12039.

Nazari et al., "A 15Gb/s 0.5mW/Gbps Two-Tap DFE receiver with Far-End Crosstalk Cancellation", Institute of Electrical and Electronic Engineers, Oct. 2012, IEEE J. Solid State Circuits, vol. 47, No. 10, pp. 2420-2432.

Cowan et al., "Phase-Locked Loop Architecture for Enhanced Voltage-Controlled Oscillator Phase-Noise Suppression", Institute of Electrical and Electronic Engineers, May 2013, Proc. IEEE Int. Symp. Circuits and Systems, pp. 2476-2479.

Walkin et al., "Multilevel Signaling for Increasing the Reach of 10 Gb/s Lightwave Systems", Institute of Electrical and Electronic Engineers, Nov. 1999, IEEE J. Lightwave Technology, vol. 17, No. 11, pp. 2235-2248.

Vegas Olmos et al., "Five-Level Polybinary Signaling for 10Gbps Data Transmission Systems", Optical Society of America, Aug. 2013, Optics Express, vol. 21, No. 17, pp. 20417-20422.

Hai et al., "A 20 Gb/s SiGe Photoreceiver based on Optical Time Sampling", Institute of Electrical and Electronic Engineers, Sep. 2015, IEEE Proc. European Conference on Optical Communications, paper Tu.1.3.5.

Guintoni et al., "Continuously Tunable Delay Line based on SOI Tapered Bragg Gratings", Optical Society of America, May 2012, Optics Express, vol. 20, No. 10, pp. 11241-11246.

Khan et al., "Complementary Apodized Grating Waveguides for Tunable Optical Delay Lines", Optical Society of America, Aug. 2012, Optics Express, vol. 20, No. 18, pp. 19859-19867.

Orlandi et al., "Tunable Silicon Photonics Directional Coupler Driven by a Transverse Temperature Gradient", Optical Society of America, Mar. 2013, Optics Letters, vol. 38, No. 6, pp. 863-865.

Hai et al., "Integrated Optical Deserialiser Time Sampling Based SiGe Photoreceiver", Optical Society of America, Dec. 2015, Optics Express, vol. 23, No. 25, #250614, pp. 1-19.

Abiri et al., "An Adjustable Self-Equalizing Photo Detector," Institute of Electrical and Electronic Engineers, Mar. 2015, Proc. IEEE Optical Fiber Communication Conference/National Fiber Optic Engineers Conference, paper W3A.3.

* cited by examiner

TIME SAMPLED PHOTODETECTOR DEVICES AND METHODS

CROSS-REFERENCE TO RELATED APPLICATIONS

This patent application claims the benefit of priority from U.S. Provisional Patent Application 62/232,645 filed Sep. 25, 2015 entitled "High-Speed Silicon Photonic Photoreceivers based on Optical Time Sampling", the entire contents of which are incorporated herein by reference.

FIELD OF THE INVENTION

This invention relates to optical photodetectors and more particularly to optical time sampled photodetectors.

BACKGROUND OF THE INVENTION

Internet comprises over 100 billion plus web pages on over 100 million websites being accessed by nearly 3 billion users conducting approximately 3 billion Google searches per day, sending approximately 150 billion emails per day. With statistics like these the data being uploaded and downloaded every second on the Internet is staggering even before considering the expected growth of high bandwidth video in mobile applications etc. In 2016 user traffic is expected to exceed 100 exabytes per month, over 100,000,000 terabytes per month, or over 42,000 gigabytes per second. However, peak demand will be considerably higher with projections of over 600 million users streaming Internet high-definition video simultaneously at peak times.

All of this data will flow to and from users via data centers and across telecommunication networks from ultra-long-haul networks down through long-haul networks, metropolitan networks and passive optical networks to users through Internet service providers and then Enterprise/small office—home office (SOHO)/Residential access networks. In the long-haul national and regional backbone networks and metropolitan core networks dense wavelength division multiplexing (DWDM) with channel counts of 40 or 100 wavelengths supporting 10 Gb/s and 40 Gb/s data rates per channel have been deployed over the past decade and are now being augmented with next generation 40 Gb/s and 100 Gb/s technologies for ultra-long-haul, long-haul and metropolitan networks.

Historically, the optical layer within telecommunications networks has been simplified for transmission with data processing performed in the electrical domain. Essential in each of these optical communication links is the photodetector (PD) within the receiver front-end for converting the received optical signal into the electrical domain. Moreover, the overwhelming majority of optical receivers employ a transimpedance amplifier (TIA) in conjunction with the photodetector in order to amplify the received electrical signal as well as convert the photocurrent into a voltage wherein subsequent decision/error correction circuits etc. regenerate the electrical data. In the ongoing drive for increased performance, reduced cost, etc. materials such as silicon-germanium (SiGe) are being explored as promising candidates for photonic integration of the photodetector functionality with the front end TIA electronics for high bandwidth/data rate communication links. However, an important consideration is the bandwidth mismatch between the optical PD and the electronic TIA circuit. For example, whilst the bandwidth of a SiGe PD can be extended up to 60 GHz through exploiting inductive gain the provisioning of suitable TIAs at such bandwidth remains challenging.

Photonic integration exploiting standardized silicon photonic processes has evolved to the level that permits affordable fabrication of complex optical systems. Accordingly, new paradigms and architectures can be exploited to either optimize optoelectronic devices or support processing in the optical domain to ease the performance requirements of the front end electrical components and processing circuits with anticipated reductions in the cost and/or the power consumption of these electronic circuits.

To date the focus of photonic integration has been primarily towards parallelism within the optical domain through wavelength division multiplexing (WDM) or exploiting the dual polarizations within optical waveguides. However, in many architectures "brute-force" time division multiplexing (TDM) offers benefits through reduced complexity and cost. Despite this photoreceivers either in discrete or optical waveguide forms are primarily the same now for 10 Gb/s, 20 Gb/s and above TDM as they were 20 or 25 years ago. Accordingly, it would be beneficial to provide optical circuit designers with a new approach allowing them to exploit the inherent high TDM capabilities of optical links without resorting to expensive electronics but leveraging high speed CMOS and other integrated circuit methodologies.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to optical photodetectors and more particularly to optical time sampled photodetectors.

In accordance with an embodiment of the invention there is provided a method comprising receiving an optical input amplitude modulated at a predetermined data rate X Gb/s;
optically splitting the received optical signal into N optical channels at X Gb/s and coupling each channel to a predetermined optical detector, wherein the optical signal at each optical detector differs in time relative to the optical signal at an adjacent optical detector by that equivalent to a single bit at X Gb/s;
time averaging the output of each optical detector for a duration equivalent to N bits at X Gb/s;
gating the time averaged signal from each optical detector at a rate of X/N Gb/s to generate N streams of symbols; and
digitally processing the N streams of symbols to generate the original X Gb/s data.

In accordance with an embodiment of the invention there is provided a system comprising:
an input port for receiving an optical input amplitude modulated at a predetermined data rate X Gb/s;
an optical splitter for optically splitting the received optical signal into N optical channels at X Gb/s and coupling each channel to a predetermined optical detector, wherein the optical signal at each optical detector differs in time relative to the optical signal at an adjacent optical detector by that equivalent to a single bit at X Gb/s through optical delays lines at least one of forming part of the optical splitter and coupled to the optical splitter;
a plurality of front end electronic circuits each connected to an optical detector, each front end electronic circuit:

time averaging the output of each optical detector for a duration equivalent to N bits at X Gb/s;

gating the time averaged signal from each optical detector at a rate of X/N Gb/s to generate N streams of symbols; and a digital processor for digitally processing the N streams of symbols to generate the original X Gb/s data.

In accordance with another embodiment of the invention there is provided a system comprising:

an input port for receiving an optical input amplitude modulated at a predetermined data rate X Gb/s;

a pre-processing circuit for processing an optical signal received at the input port, the processing for generating N channels from the received optical signal, wherein each channel is time averaged for a duration equivalent to N bits at X Gb/s with an equivalent data rate of X/N Gb/s and time delayed by a predetermined number of bits of the X Gb/s input signal; and a processing circuit coupled to the pre-processing circuit for receiving the N channels of time delayed and averaged data and generating in dependence upon these the original X Gb/s data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
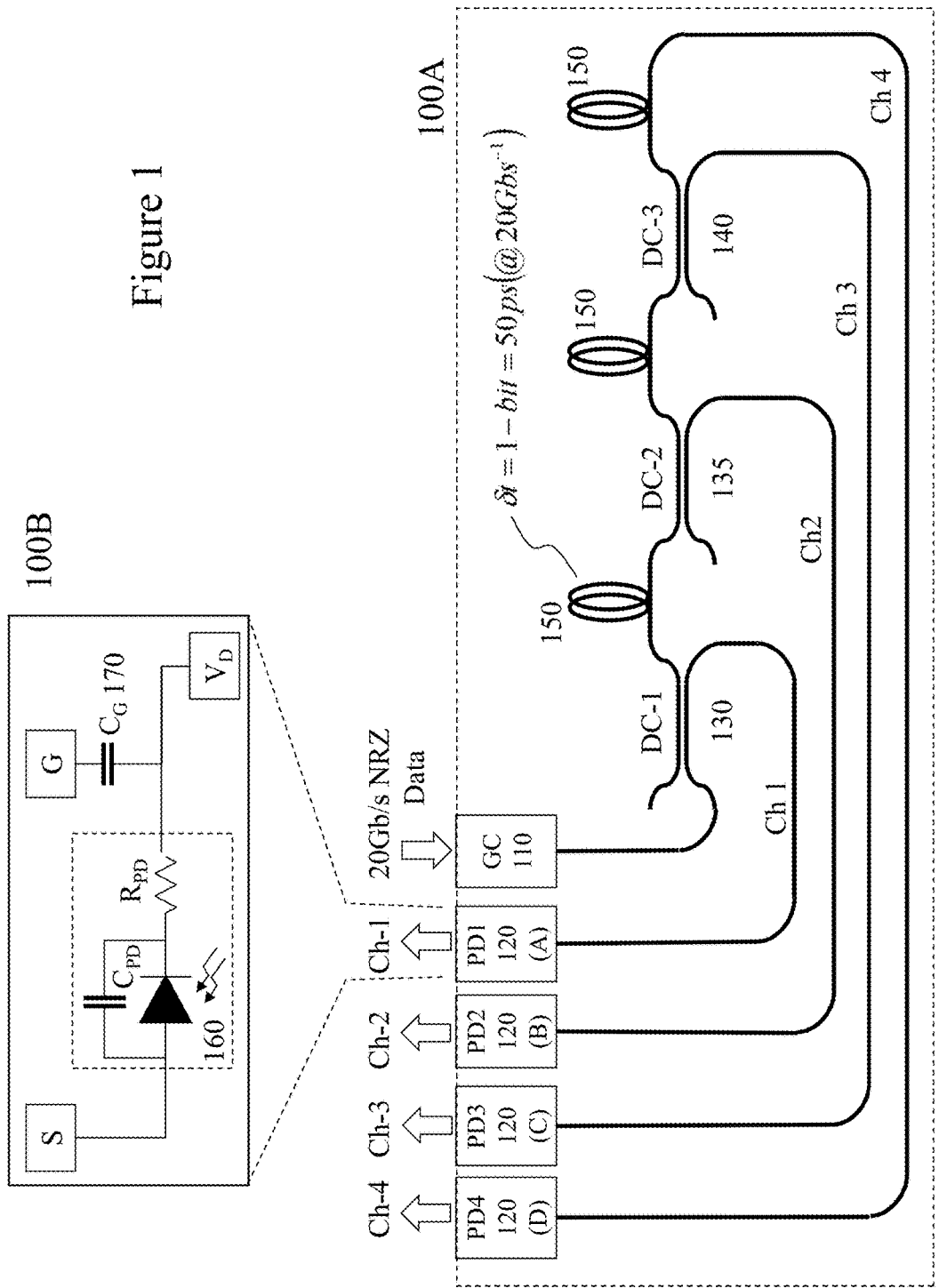
FIG. 1 depicts a schematic diagram of an optical time sampling photodetector architecture according to an embodiment of the invention.

The present invention is directed to optical photodetectors and more particularly to optical time sampled photodetectors.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "photodetector" (PD) as used herein and throughout this disclosure, refers to a semiconductor device that converts light into an electrical signal. This includes, but is not limited to, photodiodes wherein photons are absorbed in a p-n junction or a p-i-n (PIN) structure such as photodetectors (PDs) or avalanche photodiodes (APDs) and metal-semiconductor-metal (MSM) photodetectors where the photons generate electrons and holes within a pair of biased Schottky contacts. Photodiodes for data applications are operated generally in a photoconductive mode by reverse biasing such that the cathode is positive with respect to the anode and many p-i-n photodiodes exploits heterojunction structures. The wavelength responsivity of the photodetector is determined by the materials selected for its formation or conversely the material options are defined by the operating wavelength of the system within which the photodetector operates. Typical materials include silicon (~200 nm to ~1100 nm), silicon germanium (~1200 nm to ~1600 nm), gallium arsenide (e.g. AlGaAs/GaAs 700 nm to 870 nm), indium phosphide (e.g. InGaAs/InP 1300-1650 nm), and indium gallium arsenide although other materials may be used in the visible, near infra-red and the mid infra-red (such as lead sulphide and mercury cadmium telluride for example). A photodetector may be coupled to an optical waveguide, for example, through coupling to the p-i-n structure through the surface of the semiconductor device or through end-coupling an optical waveguide to a waveguide p-i-n structure. The later allowing monolithic integration rather than hybrid integration.

A "trans-impedance amplifier" (TIA) as used herein and throughout this disclosure, refers to a current-to-voltage converter. A TIA is typically implemented using an operational amplifier. However, it would be evident that the amplification of the received electrical signal may employ other amplifier designs discretely wherein conversion of the current to voltage is performed prior to the amplification stage or in combination with a TIA wherein amplification may be performed after the TIA which is employed primarily as a current-to-voltage converter.

An "optical waveguide" (waveguide) as used herein and throughout this disclosure, refers to a three-dimensional structure confining an optical signal within a predetermined wavelength range established in dependence upon the material(s) of the optical waveguide. An optical waveguide may be formed through a range of techniques including, but not limited to, material composition through layered structures, rib-loading, ridges, doping, diffusion, deposition-etch-deposition processing, ion-implantation, and ion-exchange. Materials within which optical waveguides may be formed or implemented include, but are not limited to, polymer-on-silicon, doped silicon, silicon-germanium, polymeric waveguides, silicon-on-insulator, silicon oxynitride, semiconductor materials, lithium niobate, and lithium tantalite. Silicon-on-insulator (SOI) waveguides may include, but not be limited to, silicon, germanium, silicon germanium, silicon nitride, silicon oxynitride. An insulator within an SOI waveguide may include, but not be limited to, intrinsic buried oxide (BOX) layer(s), fabricated BOX layer(s), and silicon-oxide clad silicon. An optical waveguide may form part of a photodetector wherein a p- or p-i-n structure is implemented and electrodes formed on the surface of optical circuit allow application of the required reverse bias.

A "semiconductor material" (semiconductor) as used herein and throughout this disclosure, refers to a material which is nominally a small band gap insulator but may be doped with impurities that alter its electronic properties in a controllable way. Controlled introduction of impurities ("doping") into the crystal structure lowers the material's whilst permitting the creation of semiconductor junctions between differently-doped regions of the extrinsic semiconductor crystal. Semiconductor materials include, but are not limited to, Group IV elemental semiconductors, Group IV compound semiconductors, Group VI elemental semiconductors, III-V semiconductors, II-VI semiconductors, I-VII semiconductors, IV-VI semiconductors, IV-VI semiconductors, V-VI semiconductors, II-V semiconductors, oxides, layered semiconductors, and organic semiconductors. Semiconductor materials providing optical waveguides, optical emitters, and optical photodetectors within systems operating in the visible, 850 nm, 1310 nm, and 1550 nm include InP, InGaAsP, GaAs, AlGaAs, GaInN, AlInGaP, and GaInNAs.

1. Optical Time Sampled Photodetector Concept

The inventors propose a novel photoreceiver design that performs optical time sampling to reduce the operating speed of the processing electronics thereby presenting a new design paradigm to the optical circuit and optical link designers. Accordingly, the inventors present a design methodology and photoreceiver circuits wherein an incoming XGbs$^{-1}$ optical data stream is sampled and processed by N photodetectors each operating at (X/N)Gbs$^{-1}$ rather than the current direct XGbs$^{-1}$ front-end of the prior art. Flexibility for the designer in establishing N within optical layer constraints, electronics capabilities etc. allows for further cost—power—complexity—performance tradeoffs to be established in different systems such that high capacity TDM links can exploit direct CMOS integrated optoelectronic front-ends.

Within the embodiments of the invention described below and depicted in respect of FIGS. 1 to 8 this design concept is presented with respect to a 20 Gb/s photoreceiver employing a 4 channel optical sampling circuit with 4 photodetectors that operate at ¼ of the data rate, e.g. 5 Gb/s. However, the design concept may be generalized for an XGb/s photoreceiver employing N channels such that each channel only operates with a photodetector (PD) at (X/N)Gb/s.

Accordingly, the optical input to the photoreceiver is distributed uniformly to each PD but is delayed incrementally across the array of PDs by one-bit period between each PD. Accordingly, each PD generates the same electrical bit stream but offset in time relative to the other PDs. Accordingly, by exploiting the correlation property between the four PD channels, it is possible to electronically process the PD signals at a fraction of data rate ((X/N)Gb/s) to recover the original XGb/s signal. Accordingly, this scheme simplifies the post electronic circuit design and reduces the dynamic power consumption of the electronic circuit by lowering the sampling rate of the received signal. The speed reduction factor is proportional to N, the number of PDs, which is limited by the optical constraints established by the optical link such as received optical power, data rate, sensitivity, bit error rate (BER) etc. and the front end optical distribution—delay circuit loss.

Referring to FIG. 1 there is depicted a schematic diagram of an optical time sampling photodetector architecture according to an embodiment of the invention for operation at 20 Gb/s with N=4 channels. Accordingly, an optical signal encoded with 20 Gb/s non-return to zero (NRZ) data is coupled to the circuit 100A via, in this embodiment with silicon optical waveguides, a grating coupler (GC) 110. The energy of the optical signal is split over four output channels (Ch-1 to Ch-4) via three directional couplers (DC-1 130, DC-2 135, and DC-3 140) with tap ratios established such the four outputs are balanced. Each pair of directional couplers and linked via a delay line and the fourth channel from the third directional coupler is also delayed by a delay line. Each delay line has a delay of 1-bit which at 20 Gb/s equates to δt=50 ps or a delay of approximately 1.5 cm air equivalent. Accordingly, within a planar waveguide geometry in silicon this optical delay varies according to the effective index of the optical waveguide. For a standard 220 nm×500 nm silicon-on-insulator (SOI) this equates to a 3.6 mm (~0.14") long silicon waveguide delay line is used between two adjacent channels. The inventors also established an alternate SOI waveguide, referred to within this specification as low-loss SOI, with a 220 nm×3 μm cross-section geometry, lower $n_{eff}$ and lower propagation loss. Using this the silicon optical waveguide delay line is 4.1 mm (~0.16") long. The power coupling ratio of each directional coupler is adjusted to not only account for the sequential tap series of outputs but also for compensating excess loss in each output path and the delay line loss between directional couplers. It would be evident to one skilled in the art that higher speed implementations result in shorter delays and hence lower delay waveguide losses. The power coupling ratio the directional couplers are adjusted by varying their coupling length to compensate the optical propagation loss in the delay lines.

Each channel, Ch-1 to Ch-4, is coupled to one of the four photodetectors (PD) 120(A) to 120(D) respectively wherein the converted electrical signals are coupled to the decision making—processing circuit. Also depicted in FIG. 1 is a PD schematic 100B depicting an integrated Silicon-Germanium (SiGe) PD such as employed to form the four PDs (PD) 120(A) to 120(D) respectively in circuit 100A. Exploiting SiGe PDs allows monolithic integration with a silicon waveguide technology for the optical splitting—delay line circuit elements although as noted supra other optical waveguide technologies may be exploited in conjunction with, depending upon the optical waveguide technology, monolithic, hybrid or discrete integration methodologies for the PDs. As depicted the PD 160 has an on-chip biasing capacitor ($C_G$) 170 whilst the PD 160 comprises series resistance $R_{PD}$ and capacitance $C_{PD}$ which define its time constant and hence bandwidth. This facilitates the provisioning of a DC reverse bias voltage for the PD 160 on the chip depicted in circuit 100A or a larger optoelectronic circuit within which circuit 100A forms part.

Figure 2:
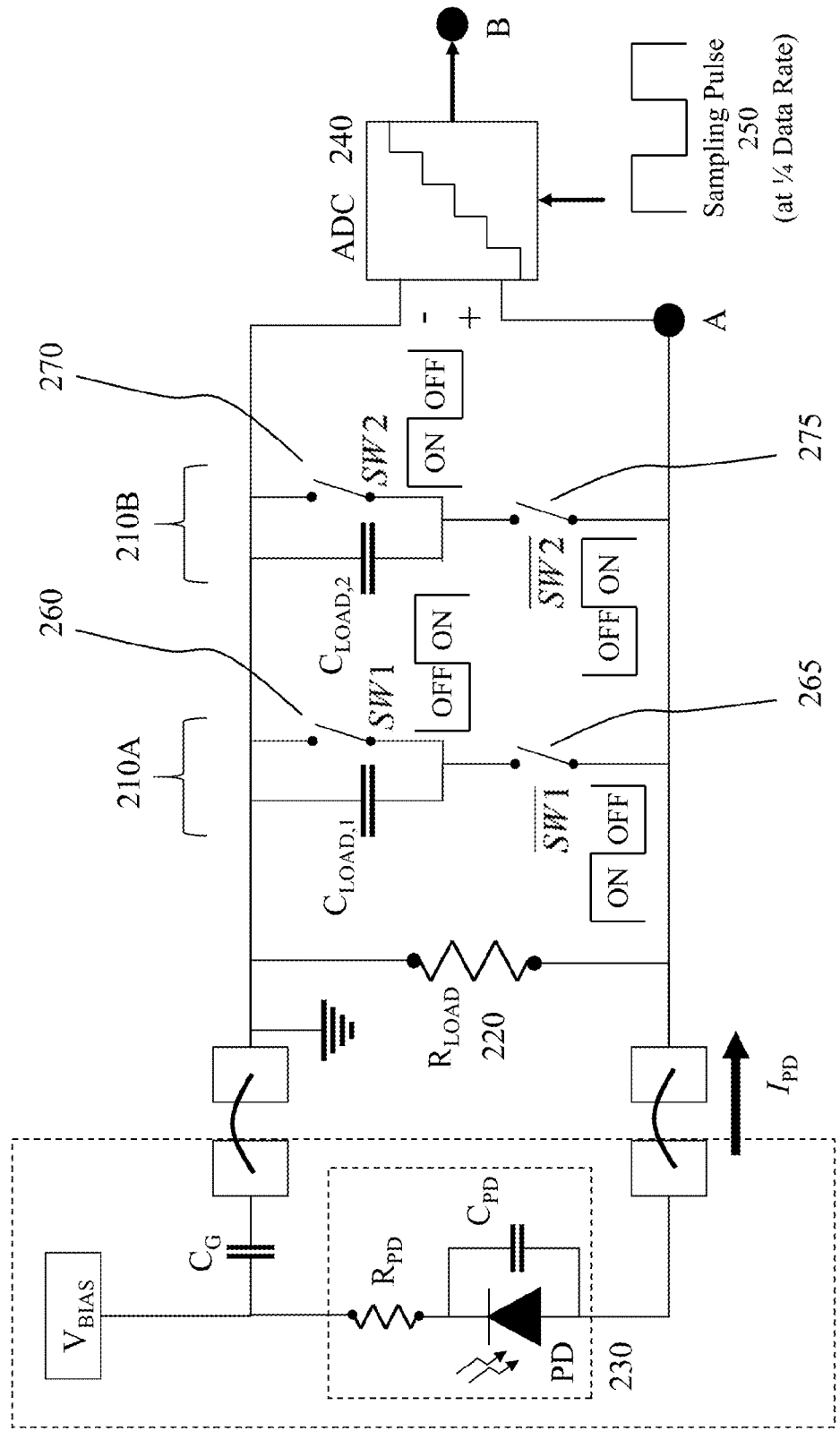
FIG. 2 depicts an electrical equivalent circuit for an optical receiver channel front-end exploiting an optical time sampling photodetector architecture according to an embodiment of the invention.

Subsequent to their conversion into the electrical domain the 20 Gb/s NRZ optical signals detected by each of the four PDs (PD) 120(A) to 120(D) are converted to the electrical domain with an electronic circuit front-end circuit such as that depicted in FIG. 2. Due to the one-bit optical delay lines, the four electrical signals from the four PD channels are each delayed from each other by one bit. After the O/E conversion within each PD 230 circuit, which is biased at $V_{BIAS}$, the voltage of each of the four resulting electrical signals are accumulated over a period of four bits through a capacitive load ($C_{LOAD}$) in the electronic circuit front-end circuit having been initially converted to a voltage via the resistive load, $R_{LOAD}$ 220. After each period of four bits, the accumulated signal at point "A" is sampled at one quarter (¼) of the data rate and processed by an analogue-to-digital converter (ADC) 240. The load capacitor ($C_{LOAD}$) voltage is then reset to zero for the next cycle.

To overcome the challenge of a high-speed reset, two capacitive loads ($C_{LOAD}$) are operated in switched capacitor mode through first and second switched capacitor circuits 210A and 210B respectively such that over every period of four bits, one of the load capacitors accumulates charge whilst the other load capacitor is discharged though a switch (SW). This process being evident in FIG. 2 by considering the operation of the first and second switched capacitor circuits 210A and 210B respectively. Accordingly, during a first cycle $C_{LOAD,1}$ within first switched capacitor circuit 210A accumulates charge wherein the switches and first to fourth switches SW1 260, $\overline{SW1}$ 265, SW2 270 and $\overline{SW2}$ 275 are in off (open), on (close), on (close) and off (open) states, respectively. In this switching state, $C_{LOAD,2}$ is being discharged through SW2 270. Over the duration of the next four bits, opposite switching conditions are established wherein first to fourth switches SW1 260, $\overline{SW1}$ 265, SW2 270 and $\overline{SW2}$ 275 are in the on (close), off (open), off (open) and on (close) states, respectively). In this configuration, $C_{LOAD,2}$ accumulates charges and $C_{LOAD,1}$ is discharged through SW1 260.

The four streams of symbols are digitally processed at ¼ of the data rate to generate the original input bit stream. Depending on the sequence and value of the four bits, each sampled symbol can be normalized to one of five possible levels (i.e. 0, 0.25, 0.5, 0.75, 1). A 3-bit ADC 240 can be used to pass the 5 level symbols generated from each of the PD channels simultaneously to the digital signal processing (DSP) blocks, i.e., to an adder-subtractor, through a sampling pulse 250 applied to the 4 ADCs 240.

Within an embodiment of the invention the following algorithm may be implemented to recover the original bit streams. At every consecutive sample that is odd (m=2n−1, where n=1, 2, 3, . . . ) and even (m+1=2n), an eight symbol data segment is processed using a lookup table. That segment essentially represents the averaged received power by the 4 PDs, s=1,2,3,4, at two sampling intervals m and m+1. There is a 4-bit long time difference between two sampling intervals, m and m+1, as the averaged signals from each of the 4 PDs are sampled at every 4 bits to generate the symbols.

Therefore, the data processing electronic circuit works at ¼ of the data rate. Equations (1) and (2) present the general expression of the averaged photodetected signal from each of the 4 PDs at m and m+1 sampling intervals, respectively, where the original input bit stream is x(M−i), i is the bit sequence and M is 4(m+1).

$$D_{s,m} = \tfrac{1}{4}\Sigma_{i=s+}^{s+6} x(M-i) \qquad (1)$$

$$D_{s,m+1} = \tfrac{1}{4}\Sigma_{i=s-1}^{s+2} x(M-i) \qquad (2)$$

Accordingly, the averaged photodetected signal from each of the 4 PDs at m and m+1 sampling intervals, respectively, yield eight symbol data segments which respectively contain information in respect of 11 consecutive unknown input bits from x(M) to x(M−10). However, when m=1 (or M=8), three of the 11 input bits (x(0), x(−1) and x(−2) are equal to zero. These three zero bits actually come from the idle time segments in the 2nd, 3rd, and 4th PDs for first four input bits due to the 1-bit consecutive delay lines implemented in the optical front-end, which sets the initial condition of this algorithm. Therefore, in the first iteration (m=1 and m+1=2), it is possible to deduct the original unknown eight input bits from the eight symbols segment and eight equations. Now, in the successive iterations, the three extra input bits are known from the previous iteration, and therefore eight new unknown input values can be found. Accordingly, the inventors constructed a lookup table solving the equations for all possible combination of 8 symbols which is used to match the symbols to the 8 bits of the unknown original input signal. This lookup table has a total of 256 rows ($2^8$).

Within another embodiment of the invention a second algorithm may be implemented to recover the original bit stream. At every sample point "m", which is taken at a ¼ of the data rate, each PD channel generates a 3-bit sequence with a voltage corresponding to one of the five possible normalized levels mentioned above, representing the accumulated received power over that interval. The symbols from each PD channel are aggregated into a data segment that is then processed by solving four linear equations using simple adder-subtractor blocks. Accordingly, the data processing electronic circuit works at ¼ of the data rate. Equation (3) describes the general expression of the accumulated photodetected signal from each of the four PDs at the "$m^{th}$" sampling interval, where x(M−i) is the voltage build-up across $C_{LOAD}$ for every input bit (or photocurrent "I"), 'i' is the bit sequence and "M" is "4m".

Figure 3A:
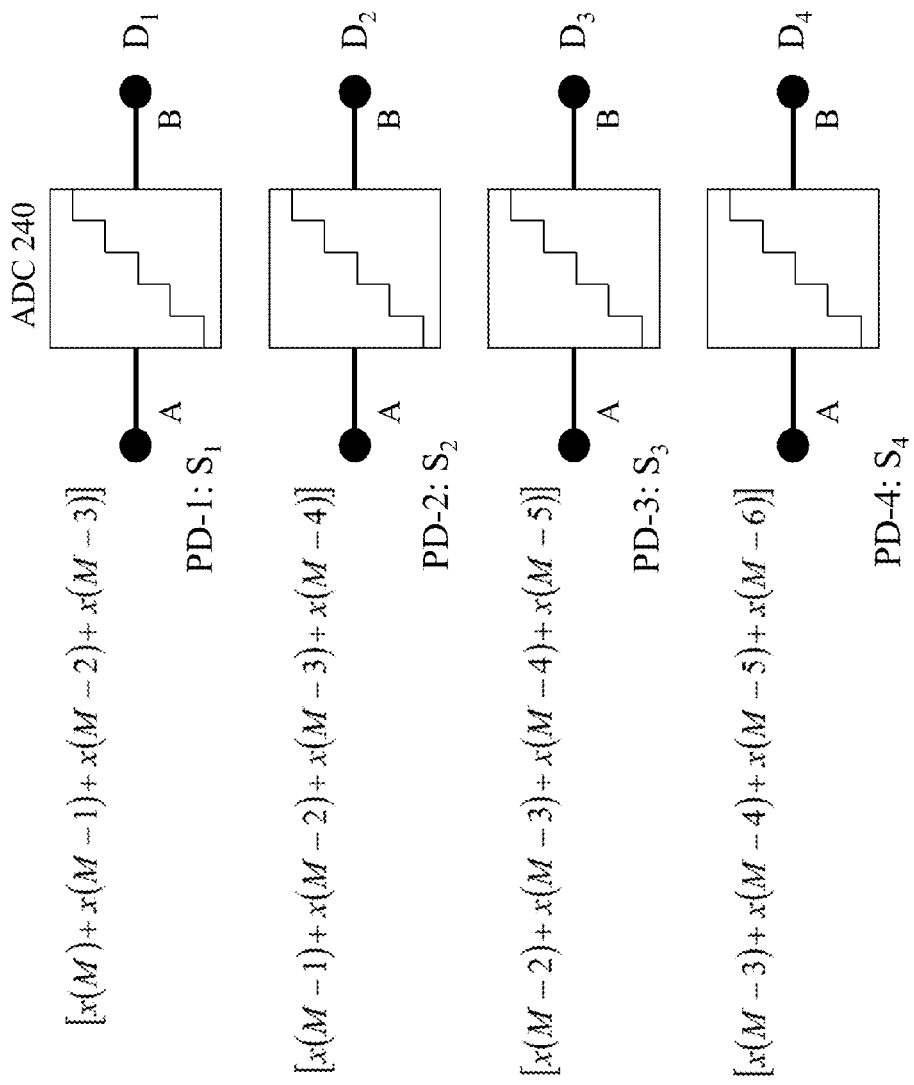
FIG. 3A depicts average values for 4 bits sampled by 4 samplers operating at ¼ of the bit rate and sent to an analog-to-digital converter (ADC) and memory unit for post-processing within an optical time sampling photoreceiver architecture according to an embodiment of the invention.

Now referring to FIG. 3A there are depicted four symbol data segments D1, D2, D3, D4 which are generated from the four PDs, s=1,2,3,4, respectively in Equation (3) contain information about 7 consecutive unknown input bits from x(M) to x(M−6). However, at the first sampling point when m=1 (or M=4), three of the 7 input bits (x(0), x(−1), and x(~2)) are equal to zero. These three zero bits actually come from the idle time segments in the 2nd, 3rd and 4th PDs for the first four input bits due to the one-bit delay lines following the 1st PD implemented in the optical front-end, which sets the initial condition of this algorithm. Therefore, from the first sampling point (m=1 or M=4), it is possible to deduce the initial four unknown input bits from the four symbol segment or four equations. Then, within the subsequent iterations, the three extra input bits are known from the previous iteration, and thus four new unknown input values can be found. Accordingly, within a digital signal processing circuit, these operations can be implemented as depicted in FIG. 3B through three adder blocks, denoted by ⊕, and six subtractor blocks, denoted by ⊖.

Figure 3B:
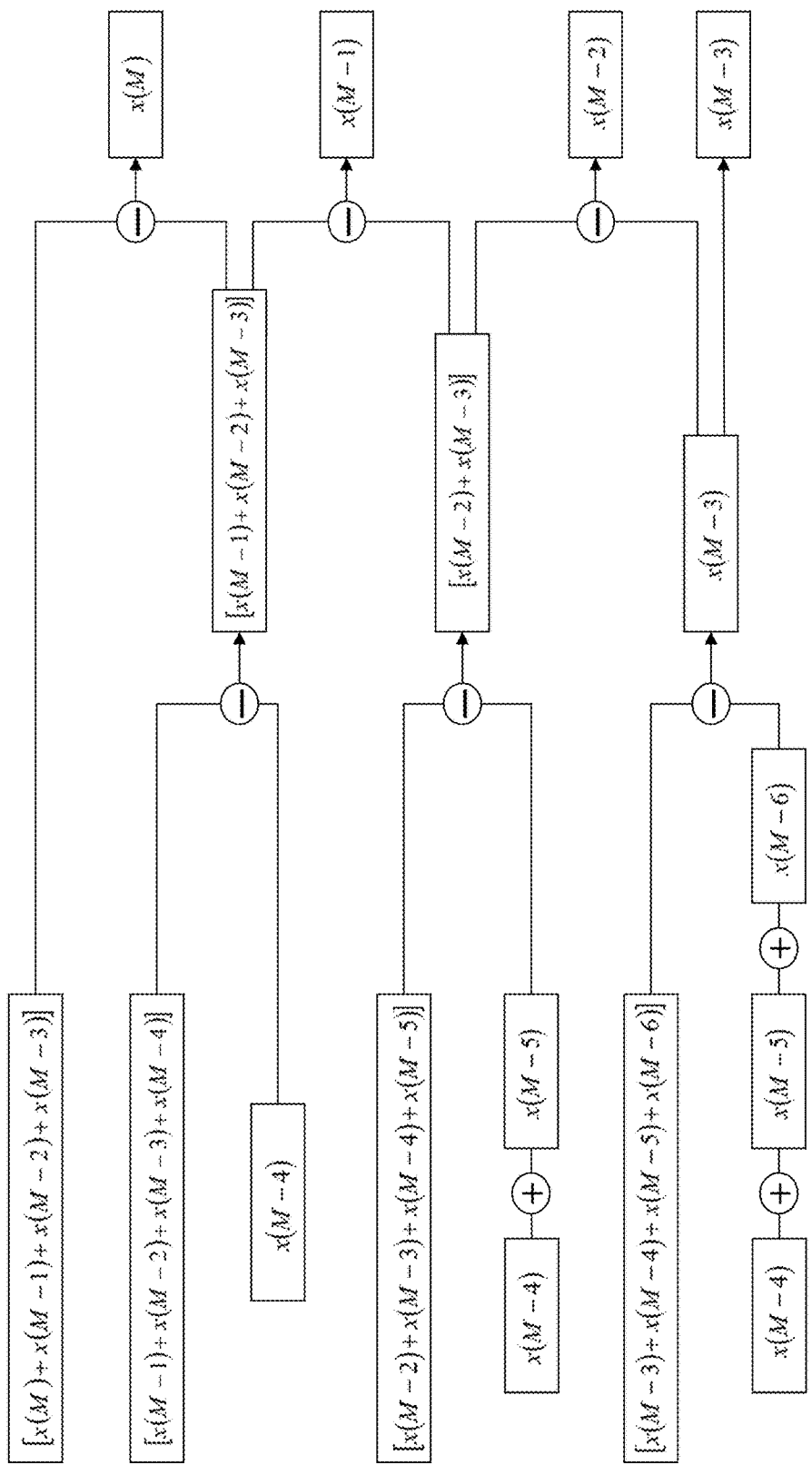
FIG. 3B depicts a block diagram of a digital signal processing method to recover the original input bit stream from the sampled signal according to an embodiment of the invention.

From FIG. 3B, it is evident that if an error occurs in the bits of the previous symbol (i.e., in x(M−4), x(M−5), or x(M−6)), then the error will propagate in all subsequent bits. To prevent this, the original electrical input bits (a(M)) at the transmitter should be pre-coded into the binary sequence (x(M)) using the same algorithm developed for poly-binary signal transmission networks, see Equation 4.

$$x(M) = a(M) \oplus x(M-1) \oplus x(M-2) \oplus x(M-3) \quad (4)$$

After the 5 level symbols generated from the ADC 240, the original input bit streams can be recovered using modulo-2 operation on the symbols by digital signal processing blocks as given by Equation (5).

$$a(M) = Ds \bmod 2 \quad (5)$$

It would be evident that the optical and analog electronic front-end circuits according to embodiments of the invention may also be employed on the 5-level symbols generated to recover the original input bits from the precoded binary streams. Precoding of the input electrical bits is done at the transmitter before optical modulation, and a modulo-2 operation on each of the symbols is performed by the DSP blocks.

The electrical front-end described and depicted in respect of FIGS. 2 to 3B exploits an integration over multiple bits with gating of the accumulated charge. Accordingly, it would be evident that the voltage signal accumulation process in the capacitive load of the electronic front-end model impacts this. The resistive load, $R_{LOAD}$, and capacitive load, $C_{LOAD}$, are such that the RC bandwidth of the electronic front-end is much lower than the actual data rate of the input signal as the post processing circuit (ADC and the DSP blocks) operates at ¼ that of the input signal data rate. Therefore, the values of $R_{LOAD}$ and $C_{LOAD}$ can be chosen such that $R_{LOAD}C_{LOAD} \gg T_b$, where $T_b$ is the one-bit period of the input signal. The inventors have also established that this also facilitates voltage build-up across the load capacitor, $C_{LOAD}$, for every input bit "1", whereas the accumulated voltage in $C_{LOAD}$ remains stable or unchanged for the input bit "0". For $R_{LOAD}C_{LOAD} \gg T_b$, the incremental voltage across $C_{LOAD}$ from its initial voltage $V_0$ can be approximated by Equation (6) which approximates to the values given by Equations (7A) and (7B) respectively for "1" and "0" bits respectively.

$$x(M-i) = \quad (6)$$
$$I \cdot R_{LOAD}\left[1 - \exp\left(\frac{-T_b}{R_{LOAD}C_{LOAD}}\right)\right] + V_0\left[\exp\left(\frac{-T_b}{R_{LOAD}C_{LOAD}}\right) - 1\right]$$

$$x(M-i) \approx \frac{I \cdot T_b}{C_{LOAD}}, \text{ for every input bit "1", where } I \cdot R_{LOAD} \gg V_0' \quad (7A)$$

$$x(M-i) \approx \frac{-V_0 \cdot T_b}{R_{LOAD}C_{LOAD}}, \text{ for every input bit "0", where } I = 0 \quad (7B)$$

From Equation (6) it is seen that if $R_{LOAD}$ can be chosen such that $I \cdot R_{LOAD} \gg_0$ or $I \gg V_0/R_{LOAD}$ then the discharge in voltage (when input bit is "0" from the load capacitor $C_{LOAD}$ is negligible compared to the voltage accumulation (when input bit is "1"). To confirm this, the inventors simulated the electronic front-end model with the Cadence circuit simulation software for a 20 Gb/s input data rate. For these simulations, they chose a parasitic resistance, $R_{PD} = 110\Omega$, and a capacitance, $C_{PD}$, =66 fF for the designed photodetector. The values of $R_{LOAD} = 1k\Omega$ and $C_{LOAD} = 2$ pF were chosen such that approximately 10 mV is accumulated across $C_{LOAD}$ after one-bit period for an input bit value of "1" or an input photocurrent of I=0.4 mA (considering $P_{IN} = -2.4$ dBm for the optical input at the PD of responsivity 0.7 A/W).

Figure 4A:
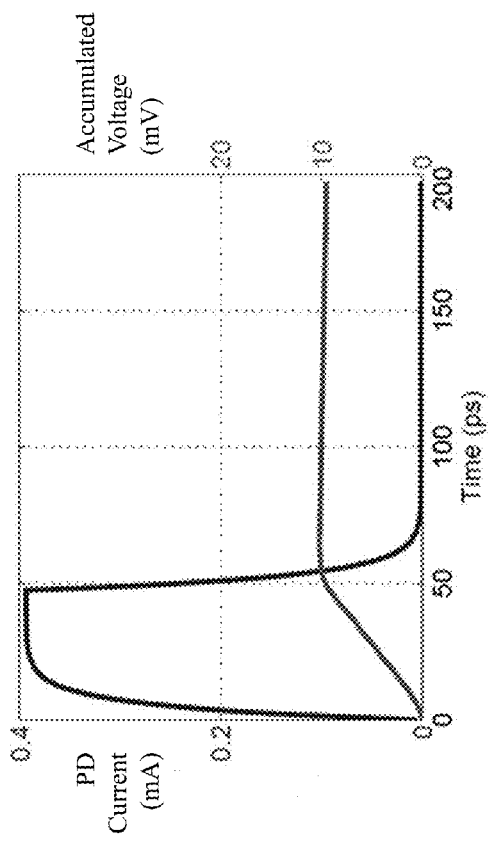
FIGS. 4A and 4B respectively depict voltage accumulation across a load capacitor within the electrical front end according to FIG. 2 for two different input bit streams.
Figure 4B:
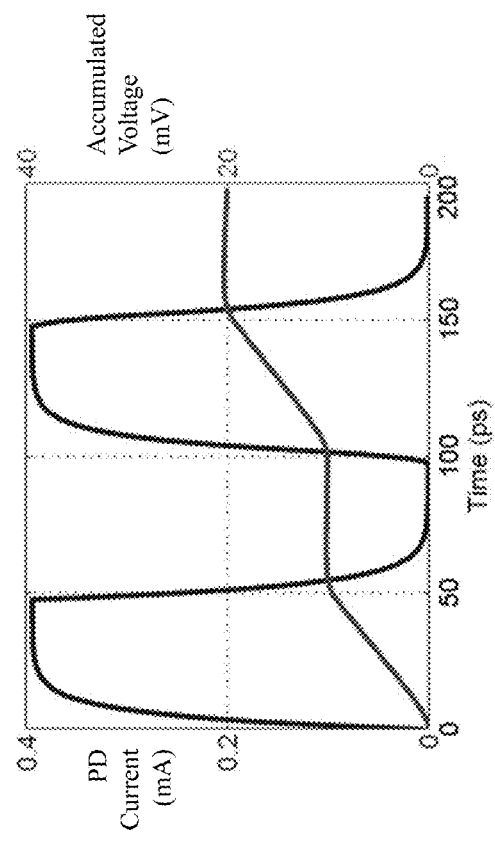

FIGS. 4A and 4B respectively depict the accumulated voltage across the load capacitor $C_{LOAD}$ after 4 bits for two cases out of the total of $2^4 = 16$ possible cases. From FIGS. 4A and 4B respectively it can be seen that the voltage discharge from the load capacitor for one "0" bit or three consecutive "0" is less than 0.5 mV. Within the following section in respect of experimental results it will be shown that the original input bits can be recovered using this circuit model within these voltage discharge limits.

2. Experimental Demonstration and Results

Figure 5:
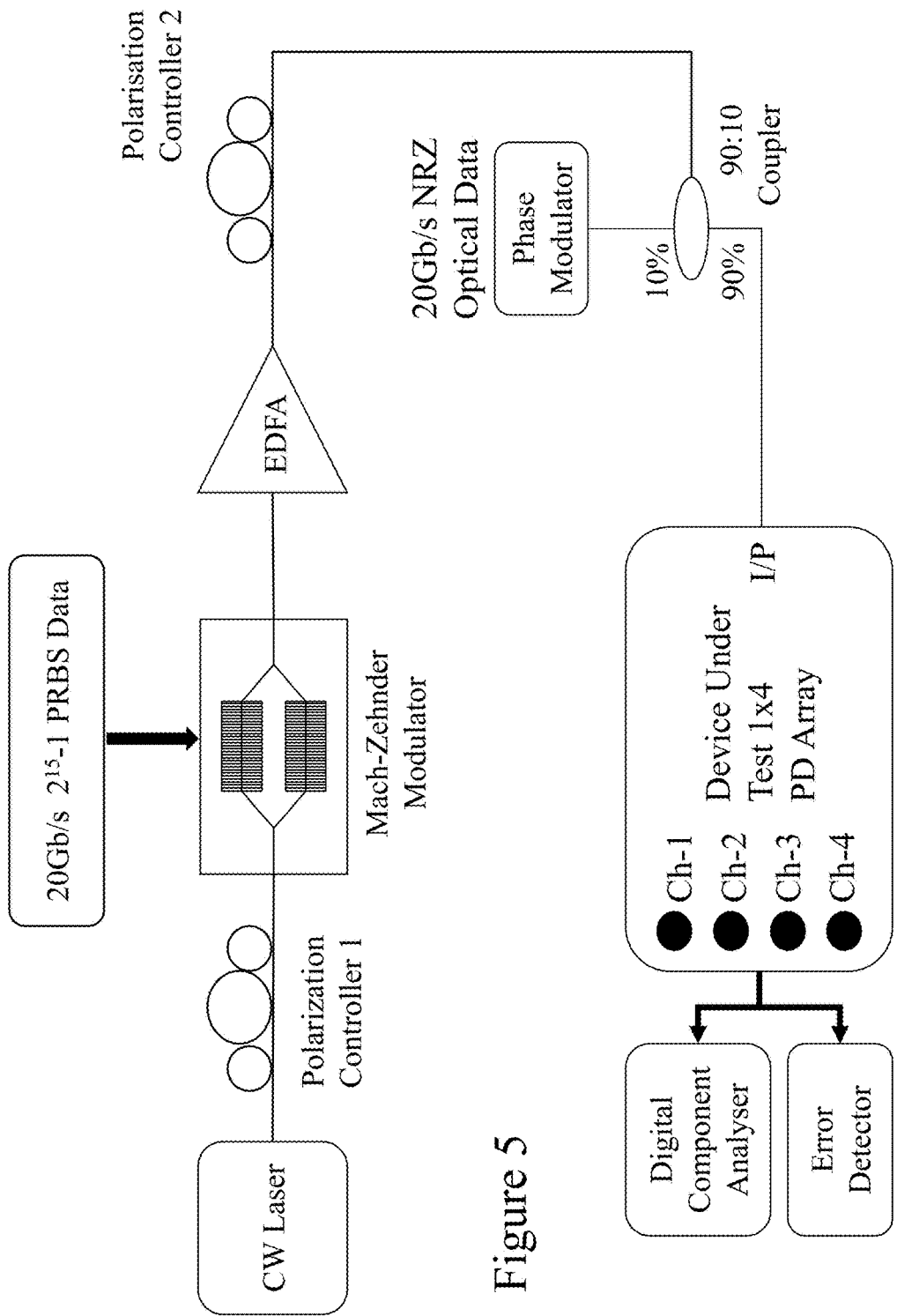
FIG. 5 depicts a schematic of an experimental system configuration for a 4-channel ¼ rate optical time sampling photodetector according to an embodiment of the invention.
Figures 6A, 6B:
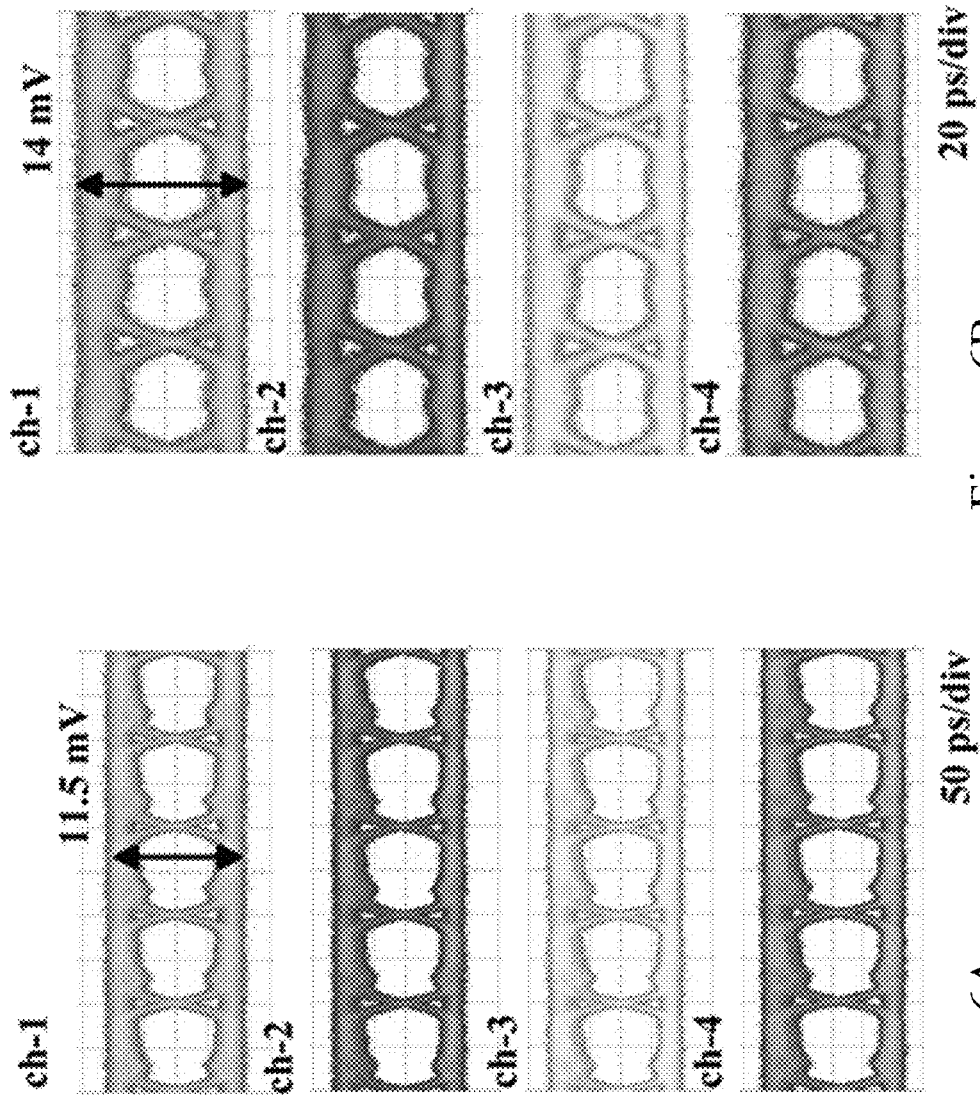
FIGS. 6A and 6B depict electrical eye diagrams obtained for each of the four channels at 10 Gb/s and 20 Gb/s respectively for standard 220×500 nm SOI optical front-end according to an embodiment of the invention.
Figure 6D:
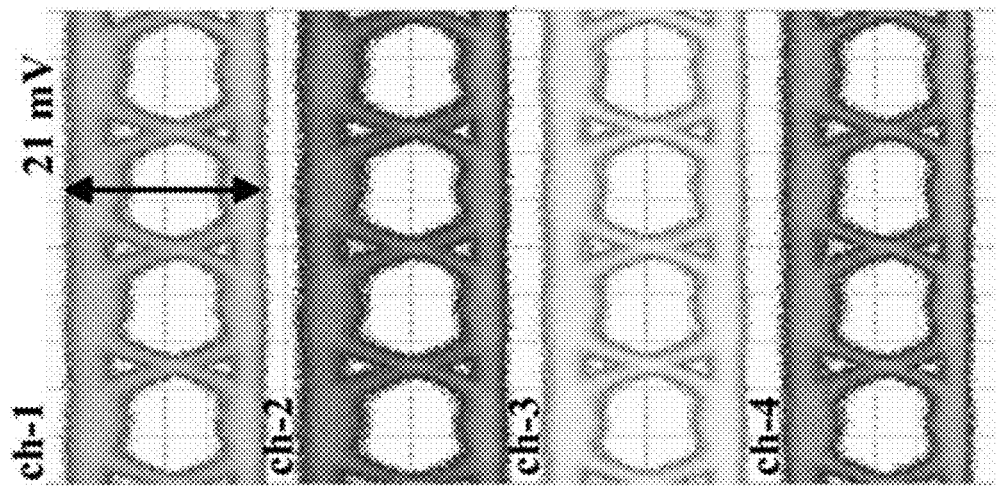
FIGS. 6C and 6D depict electrical eye diagrams obtained for each of the four channels at 10 Gb/s and 20 Gb/s respectively for a low loss 220 nm×3 µm SOI optical front-end according to an embodiment of the invention.
Figure 6C:
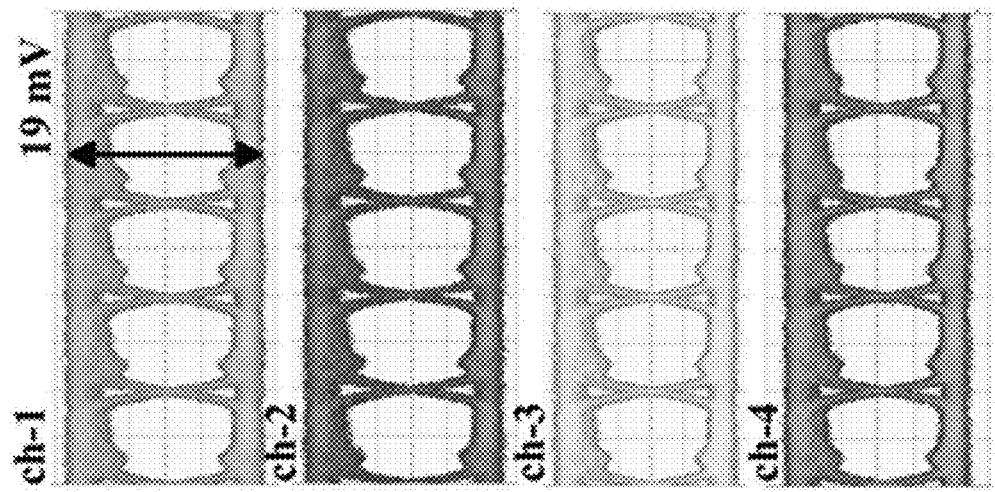
Figure 7A:
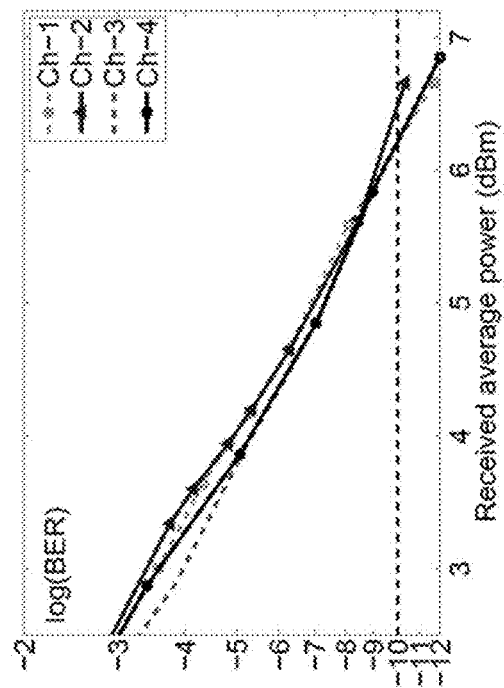
FIGS. 7A and 7B depict Bit-Error Rate (BER) as a function of the average optical power at the input (i.e. after the grating coupler) of 20 Gb/s time sampling for all 4 channels with standard 220 nm×500 nm and low loss 220 nm×3 µm SOI optical front-ends respectively.
Figure 7B:
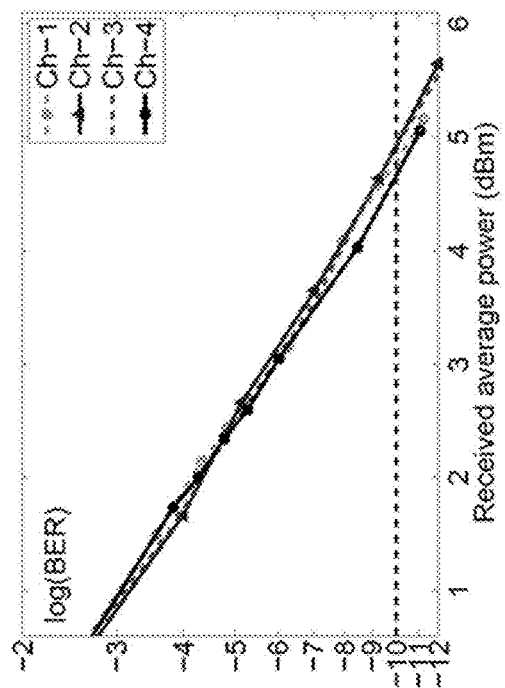
Figure 8B:
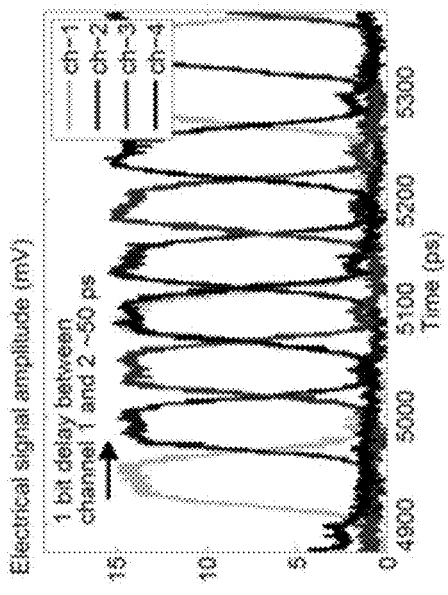
FIGS. 8A to 8D depict experimental test measurements of a 4-channel ¼ rate optical time sampling photodetector according to an embodiment of the invention showing the 1-bit delay between adjacent channels at 10 Gb/s and 20 Gb/s.
Figure 8D:
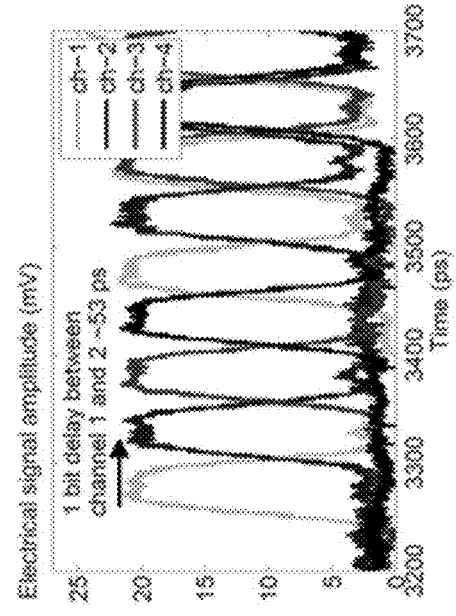
Figure 8A:
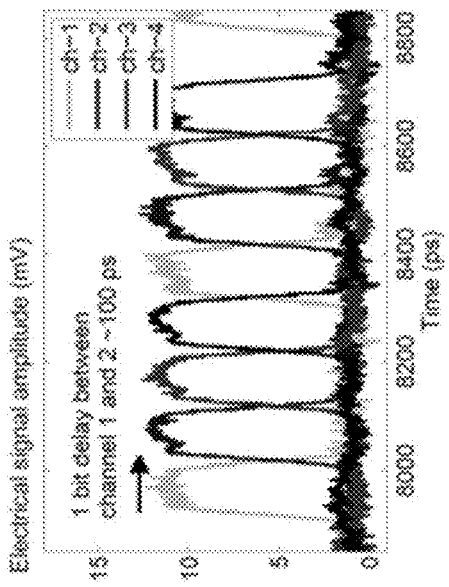
Figure 8C:
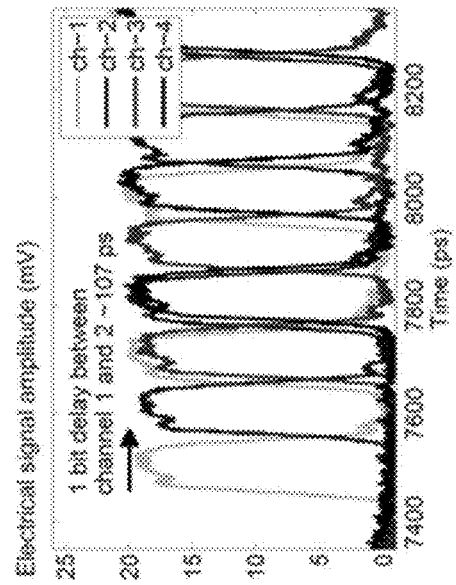
Figure 9B:
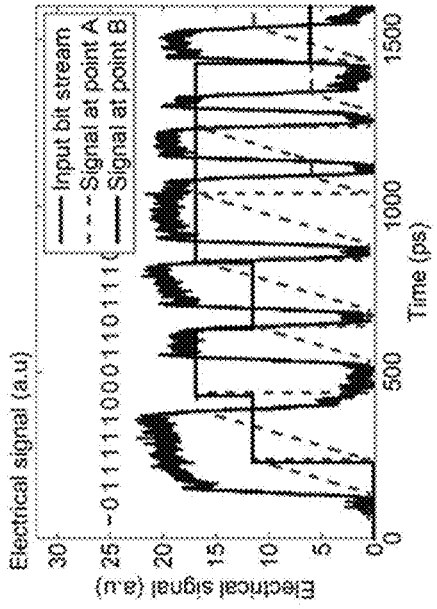
FIGS. 9A to 9D depict recovered electrical signals and input bit stream for electronic front-end circuits according to an embodiment of the invention for 4-channels of a 4-channel ¼ rate optical time sampling photodetector according to an embodiment of the invention showing the 1-bit delay between adjacent channels.
Figure 9D:
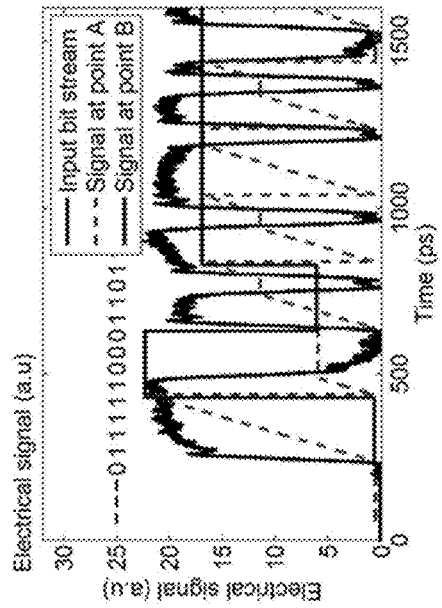
Figure 9A:
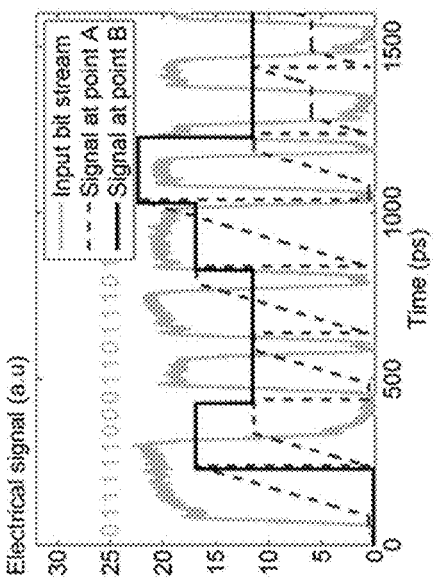
Figure 9C:
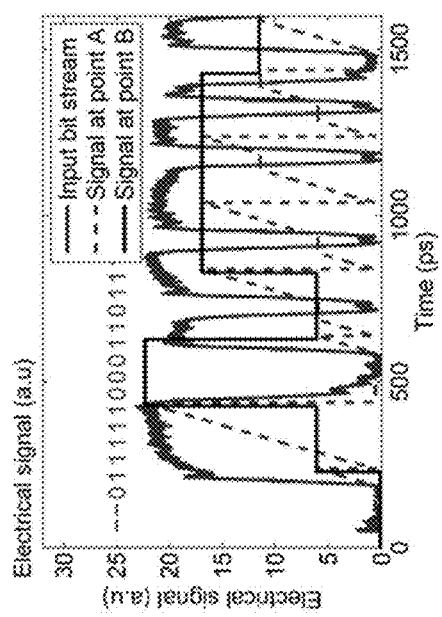

Referring to FIG. 5 there is depicted and experimental system configuration employed in establishing the time delay between adjacent PD channels within an optical time sampling photodetector according to an embodiment of the invention. As depicted in FIG. 5 the experimental set-up comprised a continuous wave (CW) laser source emitting at $\lambda=1550$ nm with an output power of +8 dBm which is modulated via a commercial LiNbO3 Mach-Zehnder modulator (MZM). A pseudo-random bit sequence (PRBS) bit pattern of length $2^{31}-1$ of non-return to zero (NRZ) on-off keying (OOK) electrical data generated from a pulse pattern generator could be used to drive the modulator. The MZM has an insertion loss of around 7 dB. To compensate this loss an EDFA with a noise figure (NF) of 5 dB was used before the device under test (DUT). However, in other experiments $2^{15}-1$ PRBS data was used to drive the MZM allowing capture and storage of the 1-bit delayed $2^{15}-1$ PRBS data generated from each of the four channels, which within initial experimental demonstrations were processed offline using the principles described supra in respect of the averaging, sampling, and signal processing. The reduction from $2^{31}-1$ PRBS to $2^{15}-1$ PRBS being necessary due to the memory storage requirements of the Digital Component Analyzer (DCA).

Referring to FIGS. 6A to 6D respectively there are depicted eye diagrams and peak-to-peak voltages recorded for each PD channel for each of the four optical front-end variations for equal received average optical power are depicted. These variations being depicted in first to fourth BER image sets in FIGS. 6A to 6D respectively representing:

First eye-diagram (FIG. 6A)—Standard SOI waveguide geometry at 10 Gb/s;
Second eye-diagram (FIG. 6B)—Standard SOI waveguide geometry at 20 Gb/s;
Third eye-diagram (FIG. 6C)—low-loss SOI waveguide geometry at 10 Gb/s; and
Fourth eye-diagram (FIG. 600D)—low-loss SOI waveguide geometry at 20 Gb/s.

From these BER image sets it is evident that the peak-to-peak output voltages of the optical front-end with low-loss SOI delay waveguides are higher compared to the optical front-ends with standard cross-section SOI waveguides. Measurement of the BER was performed using an off-chip electrical amplifier to increase the peak-to-peak electrical signal voltage up to 60 $mV_{PP}$ such that the output signal is above the sensitivity limit of the BER tester for the minimum received optical power. Accordingly, referring to FIGS. 7A and 7B respectively there are depicted BER versus average received power plots for the 20 Gb/s optical front-end with the standard and low-loss SOI delay waveguides. The average optical received power was measured at the input of the optical front-end and then adjusted to take into account the 4.75 dB loss caused by the grating coupler. From this figure it is seen that the 20 Gb/s optical front-end with low loss delay waveguides has a better sensitivity, ~1.6 dB at $1\times10^{-10}$ BER, than the 20 Gb/s optical front-end with typical 220 nm×500 nm cross-section SOI waveguides.

Subsequently, in order to recover the original input bit stream at ¼ of the line data rate, the inventors captured and stored the single bit delayed $2^{15}-1$ pseudo-random bit sequence (PRBS) data generated from each of the four channels, which for initial demonstrations were then processed offline using the principles described with respect to FIGS. 3A and 3B respectively. A $2^{15}-1$ PRBS bit stream was chosen rather than $2^{31}-1$ PRBS data due to the memory limit of the DCA. Now referring to FIG. 8 there are depicted specific segments of the captured bits for all the four channels of each of the optical front-ends. From first and second bit images in FIGS. 8A and 8B respectively that the target one bit delays of ~100 ps and ~50 ps were obtained for the 10 Gbs$^{-1}$ and 20 Gbs$^{-1}$ optical front-ends with the standard cross-section SOI waveguide. This accurate one-bit time delay was expected from both components, as it was evident from the simulation results performed by the inventors that the group index of the silicon waveguide varies by ~0.1 over the wavelength range 1500 nm$\leq\lambda\leq$1600 nm. This variation of group index can induce ~0.24 ps delay mismatch in the 7.2 mm long one-bit delay lines used in 10 Gb/s optical front ends. The low bandwidth post processing electronic circuit is transparent to this small value of time delay offset.

However, in the 10 Gbs$^{-1}$ and 20 Gbs$^{-1}$ optical front-ends with low-loss SOI waveguides, there is are ~7 ps and ~3.5 ps offsets from the exact one-bit delay between two successive channels. The time delay \offset occurs in the low-loss optical front-ends due to the use of waveguide tapers in the bending regions and the comparatively large wavelength dependence of the group index (group index variation of ~0.04 over 1500 nm$\leq\lambda\leq$1600 nm) as evident from the third and fourth images in FIGS. 8C and 8D respectively. It would be evident that in subsequent fabrication runs the time delay offset could be eliminated by design adjustment.

The captured bits were passed through a low pass filter circuit, modelled by $R_{LOAD}=1$ k$\Omega$ and $C_{LOAD}=2$ pF. These values of this resistor and capacitor were chosen such that the electronic front-end operates at ¼ of the bandwidth of the respective data channels. Within this model the data process is performed on data captured by the DCA, which is essentially a voltage signal detected with a 50$\Omega$ load. In a complete implementation, the electronic front-end will receive the PD current first, which will be used to charge the capacitor ($C_{LOAD}=2$ pF) and the resultant voltage from the capacitor will be sampled by the ADC.

Accordingly, referring to FIGS. 9A to 9D respectively there are depicted first to fourth images respectively wherein each depicts the cumulative voltage signal for every four bits from the charge storage mechanism of $C_{LOAD}$ (voltage at point "A" in FIG. 3A) and the sampled voltage at every four bit time interval (voltage at point "B" in FIG. 3A) for the input bit stream generated from the 20 Gb/s front-end with low-loss 220 nm×3 μm cross-section area SOI waveguide based delay line. The binary values of the input bit streams are also shown in FIG. 9 for illustration. As anticipated, the averaged signal at point "A" increases for every input bit "1" whereas it holds its previous value for every input bit "0". It should be noted that for every input bit "0", there is no noticeable discharge from $C_{LOAD}$, as previously described supra. At every four-bit interval the cumulative signal at point "A" is sampled and the sampled values are processed offline in MATLAB to solve a set of four linear equations using the algorithm described supra in respect of FIG. 3B. It is evident from FIGS. 9A to 9D respectively that the sampled signal values from each of the four channels (at point "B" in FIG. 3A) are unique, although they are derived from the same input bit streams which are delayed by one-bit duration from each other. Therefore, the four sampled values at each sampling period form a set of unique symbols that can be mapped to the original input bit stream by solving the four linear equations, as stipulated in the algorithm described supra.

Figure 10:
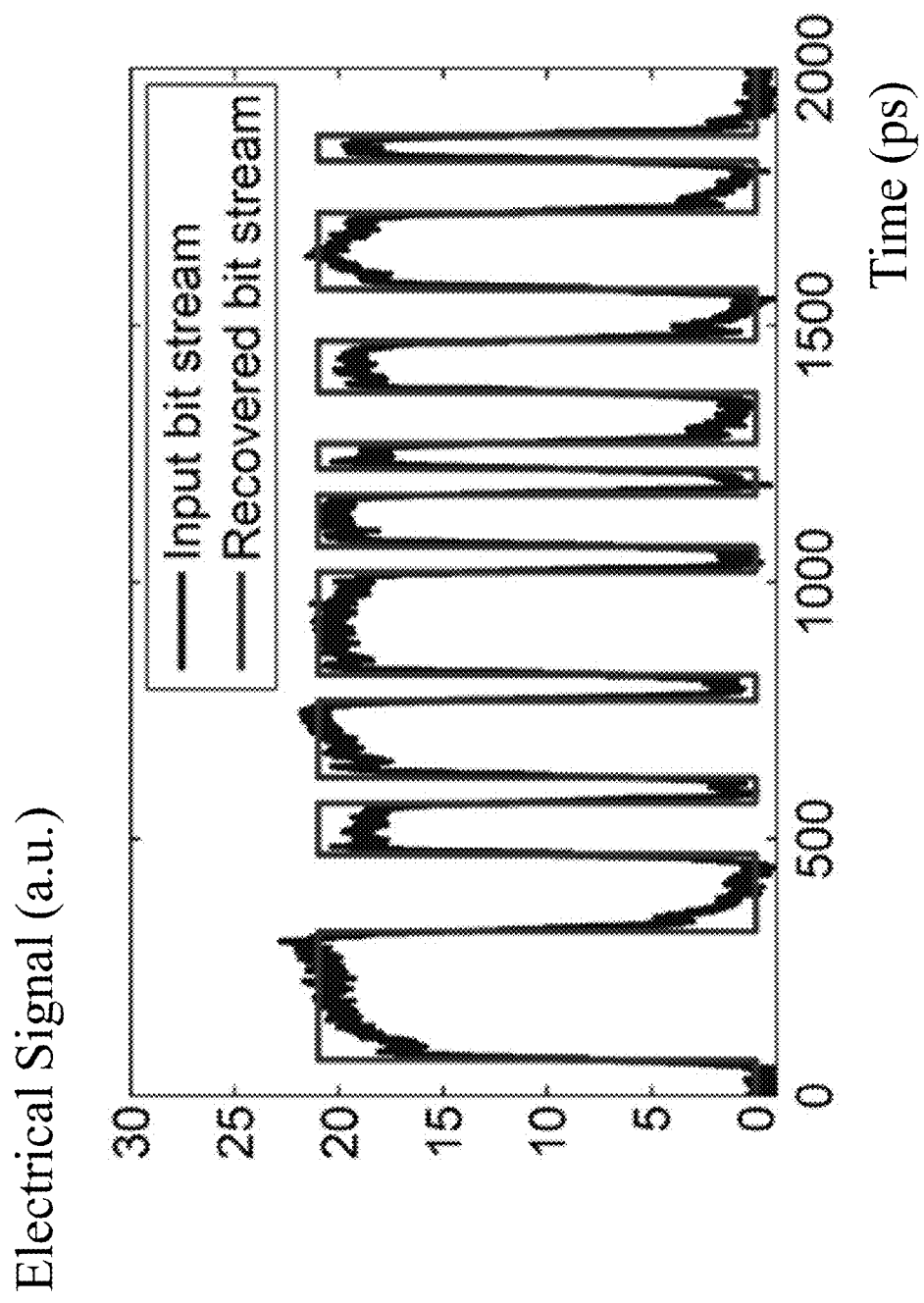
FIG. 10 depicts a recovered input bit stream after processing the four sampled channels with subtraction and additions for a 4-channel ¼ rate optical time sampling photodetector according to an embodiment of the invention showing the 1-bit delay between adjacent channels.

Now referring to FIG. 10 there is depicted the regenerated original bit stream after solving the set of linear equation using the samples values at point "B" in FIG. 3A. From this it is evident that all the bits in the $2^{15}-1$ PRBS bit stream were regenerated accurately.

Accordingly, error free detection of a 20 Gb/s optical bit stream using low bandwidth (~80 MHz) electronic front-end circuits is demonstrated in combination with a time-delayed optical sampling circuit. Harnessing the feasibility of 1-bit delay lines in the optical domain, leads to an overall low power photoreceiver architecture. The proposed architecture maximizes utilization of the full bandwidth of the high speed PDs with slow data rate TIAs.

It would be apparent that by exploiting silicon waveguides within embodiments of the invention that the optical time sampled photodetector may be integrated with control and drive control and drive circuits through their monolithic integration on substrates with integral CMOS electronics, their hybrid integration of CMOS electronics or through hybrid integration with amplifiers etc. manufactured within InP, GaAs, or SiGe for example.

It would be apparent that the data rate of the optical receivers can be extended at a lower cost and with less complexity by using the methodology of the time sampling based optic front-end according to embodiments of the invention. To increase the data rate of the photoreceiver, the bandwidth scalability of all the three important sections of the proposed receiver, i.e., optical front-end, analog RC front-end and post-electronic digital circuit would require consideration. If higher speed PDs are to be integrated with the electronic circuit, then the wire bonding and bandwidth requirement on the electronic front-end can be relaxed by increasing the number of PD channels in the optical front-end. Whilst the optical loss per channel will increase in this case due to the large optical power-dividing ratio, whereas the delay waveguide loss will decrease due to the use of shorter one-bit duration delay length waveguide at higher data rate. For example, if an 80 Gb/s data rate photoreceiver is achieved using a 60 GHz Si—Ge PD, then the same 5 Gb/s electronic frontend model presented according to an embodiment of the invention can be used, if the number of optical channels is increased from 4 to 16. However, the theoretical optical loss per channel would increase from ~6 dB to ~12 dB due to the 1×16 optical power splitter in this scenario. Accordingly, an on-chip or off-chip pre-PD semiconductor optical amplifier (SOA) may provide loss reduction without significant noise addition.

Within the embodiments of the invention presented the electronic front-end model has a RC bandwidth of ~80 MHZ which is significantly lower than the optical input signal bandwidth (~14 GHz for 20 Gbs$^{-1}$ data rate signal). Accordingly, in terms of bandwidth scalability of the entire receiver, the analog RC front-end does not impose any challenge. This facilitates simple and low-cost integration of optical and analog electronic front-ends by wire bonding, for example. Incorporating tunable time-delay and/or couplers (either thermally or electrically) in the optical front-end section of the photoreceiver could make the proposed device more robust to fabrication process variations. The performance of the overall photoreceiver will improve by simultaneously tuning the optical time delay or the coupling ratio in the optical front-end and the sampling time duration in the electronic front-end. Recent progress in the silicon photonics fabrication process makes it possible to integrate thermally tunable delay lines and directional couplers within silicon photonic integrated circuits. Integrating these components with the proposed photoreceiver can achieve accurate one-bit time delay and proper coupling ratios in the directional couplers such that uniform output power is achieved over all the four PD channels in case of fabrication process variation.

Figure 11:
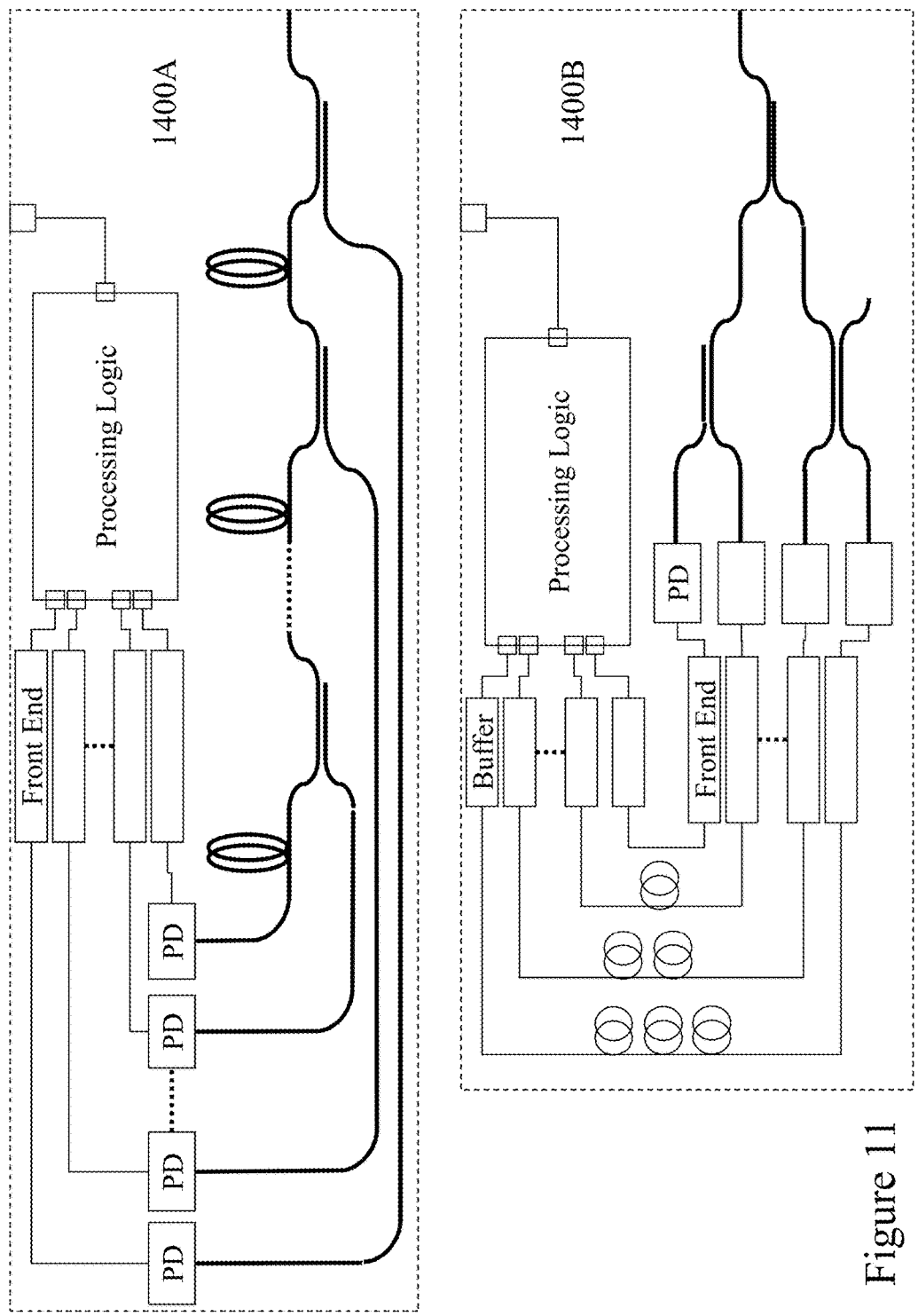
FIG. 11 depicts exemplary circuit implementations of time sampling photoreceivers according to embodiments of the invention exploiting either optical and electrical time delays prior to logic processing.

Now referring to FIG. 11 there are depicted first and second exemplary circuits 1100A and 1100B for time sampling photoreceivers according to embodiments of the invention exploiting optical and electrical time delays prior to logic processing. Within first circuit 1100A the architecture is similar to that depicted in FIG. 1 wherein an input optical signal at XGbs$^{-1}$ sequentially split and delayed through N-1 stages to generate N versions of the input optical signal before being converted to current at the photodetectors and then being averaged/gated and amplified in the analog front end circuits and then processed with the Processing Logic circuit to generate the electrical XGbs$^{-1}$. In contrast in second circuit 1100B the input optical signal at XGbs$^{-1}$ is split optically by a 1:N distribution network before being coupled to the photodetectors, front end circuit and therein the Processing Logic. However, now the delay is implemented within the electrical circuit after the front end so that the appropriate time delayed time averaged signals are gated into the buffer each cycle and then processed to regenerate the original data. Alternatively, the first circuit 1100A may be implemented without the buffers by exploiting four phases of the ¼ bit rate sampling clock which would sample the four incoming electrical signals at the same time.

It would be evident that alternatively in second circuit 1100B the delay may be implemented within the optical layer between the 1:N distribution network and array of photodetectors. It would be evident to one of skill in the art that other configurations of splitting the received signal and delaying it may be considered within the scope of the invention.

It would be apparent that the directional coupler elements within the N way 1-bit time delay optical distribution circuit between the N PDs and the optical port receiving the modulated data may be with other splitter elements including, but not limited to, multimode interferometers (MMIs), Y-junctions, asymmetric Y-junctions, zero gap directional couplers, and multiple waveguide couplers. Further, it would be evident that such coupler elements may include additional electrical control signals to tune the split ratio of the coupler elements to compensate for manufacturing variations etc.

Devices according to embodiments of the invention may be implemented as standalone circuits coupled to optical fibers either directly or through the use of intermediate coupling optics, e.g. ball lenses, spherical lenses, graded refractive index (GRIN) lenses, etc. for free-space coupling into and/or from another waveguide device. Tapered optical fibers may be employed in other embodiments. Silicon micromachining may be employed in embodiments of the invention to align the input optical waveguide to the optical time sampling PD.

In other embodiments the optical time sampling PD may be integrated monolithically, hybridly integrated, or in combination with free space optics and/or micro-optics to provide optical photodetectors coupled to a time delayed splitter network and optical input port.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
receiving an optical input amplitude modulated at a predetermined data rate X Gb/s;
optically splitting the received optical signal into N optical channels at X Gb/s and coupling each channel to a predetermined optical detector, wherein the optical signal at each optical detector differs in time relative to the optical signal at an adjacent optical detector by that equivalent to a single bit at X Gb/s;
time averaging the output of each optical detector for a duration equivalent to N bits at X Gb/s;
gating the time averaged signal from each optical detector at a rate of X/N Gb/s to generate N streams of symbols; and
digitally processing the N streams of symbols to generate the original X Gb/s data.

2. The method according to claim 1, wherein
time averaging the output of an optical detector comprises employing a resistive—capacitive network between the output of the optical detector and a transimpedance amplifier for converting a time averaged photocurrent to voltage; and
gating the time averaged photocurrent comprises activating a switch disposed between the resistive—capacitive network and the transimpedance amplifier.

3. The method according to claim 1, wherein
digitally processing the N streams of symbols comprises:
initializing the processing with a first set of gated time averaged data;
establishing a first iteration with the next gated time average data and deducing an original unknown N bits from the N symbols and their equations defining each time averaged data set to a block of received N bits;
continuing to iterate using the currently known input bits and the equations defining the time averaged data sets to recover the original data encoded onto the optical signal.

4. The method according to claim 3, wherein
the first and subsequent iterations employ a set of digital signal processing equations defining all possible combinations of N received symbols to N bits of the original signal.

5. The method according to claim 1, wherein
digitally processing the N streams of symbols comprises employing a set of digital signal processing equations defining all possible combinations of N received symbols to N bits of the original signal.

6. The method according to claim 1, wherein
optical splitting and delaying the received optical signal employs at least one of a monolithic integrated optical circuit, a hybrid integrated optical circuit, and a free space optical assembly.

7. The method according to claim 1, wherein
the steps of optically splitting, time averaging, gating and digitally processing the received optical signal at least one of reduce error propagation within an optical receiver exploiting the method and provide an alternate precoding method for polybinary signal transmission.

8. A system comprising:
an input port for receiving an optical input amplitude modulated at a predetermined data rate X Gb/s;
an optical splitter for optically splitting the received optical signal into N optical channels at X Gb/s and coupling each channel to a predetermined optical detector, wherein the optical signal at each optical detector differs in time relative to the optical signal at an adjacent optical detector by that equivalent to a single bit at X Gb/s through optical delays lines at least one of forming part of the optical splitter and coupled to the optical splitter;
a plurality of front end electronic circuits each connected to an optical detector, each front end electronic circuit:
time averaging the output of each optical detector for a duration equivalent to N bits at X Gb/s;
gating the time averaged signal from each optical detector at a rate of X/N Gb/s to generate N streams of symbols; and
a digital processor for digitally processing the N streams of symbols to generate the original X Gb/s data.

9. The method according to claim 8, wherein
time averaging the output of an optical detector comprises employing a resistive—capacitive network between the output of the optical detector and a transimpedance amplifier for converting a time averaged photocurrent to voltage; and
gating the time averaged photocurrent comprises activating a switch disposed between the resistive—capacitive network and the transimpedance amplifier.

10. The method according to claim 8, wherein
the digital processor executes a process comprising:
initializing the processing with a first set of gated time averaged data;
establishing a first iteration with the next gated time average data and deducing an original unknown N bits from the N symbols and their equations defining each time averaged data set to a block of received N bits;
continuing to iterate using the currently known input bits and the equations defining the time averaged data sets to recover the original data encoded onto the optical signal.

11. The system according to claim 8, wherein
the optical splitter, the optical delay lines, and the photodetectors each form part of an optical component; and
the optical component employs at least one of a monolithic integrated optical circuit, a hybrid integrated optical circuit, and a free space optical assembly.

12. A system comprising:
an input port for receiving an optical input amplitude modulated at a predetermined data rate X Gb/s;
a pre-processing circuit for processing an optical signal received at the input port, the processing for generating N channels from the received optical signal, wherein each channel is time averaged for a duration equivalent to N bits at X Gb/s with an equivalent data rate of X/N Gb/s and time delayed by a predetermined number of bits of the X Gb/s input signal; and a processing circuit coupled to the pre-processing circuit for receiving the N channels of time delayed and averaged data and generating in dependence upon these the original X Gb/s data.

13. The system according to claim 12, wherein the pre-processing circuit comprises:
 an optical splitter for generating the N channels;
 a plurality of optical delay lines for generating the required delays in combination with the optical splitter; and
 N photodetectors for generating N electrical signals from the N optical signals generating by the optical splitter and the plurality of optical delay lines.

14. The system according to claim 13, wherein the pre-processing circuit further comprises:
 a plurality of front end electronic circuits each connected to an optical detector, each front end electronic circuit:
  time averaging the output of each optical detector for a duration equivalent to N bits at X Gb/s; and
  gating the time averaged signal from each optical detector at a rate of X/N Gb/s to generate N streams of symbols.

15. The system according to claim 12, wherein the pre-processing circuit comprises:
 an optical splitter for generating the N channels;
 N photodetectors for generating N electrical signals from the N optical signals generated by the optical splitter; and
 a plurality of electrical delay lines electrically coupled to the N photodetectors for generating the required delays.

16. The system according to claim 15, wherein the pre-processing circuit further comprises:
 a plurality of front end electronic circuits each disposed either prior to or after an electrical delay line, each front end electronic circuit:
  time averaging the output of each optical detector for a duration equivalent to N bits at X Gb/s; and
  gating the time averaged signal from each optical detector at a rate of X/N Gb/s to generate N streams of symbols.

17. The system according to claim 12, wherein the digital processor executes a process comprising:
 initializing the processing with a first set of gated time averaged data;
 establishing a first iteration with the next gated time average data and deducing an original unknown N bits from the N symbols and their equations defining each time averaged data set to a block of received N bits;
 continuing to iterate using the currently known input bits and the equations defining the time averaged data sets to recover the original data encoded onto the optical signal.

18. The system according to claim 14, wherein the digital processor employs a set of digital signal processing equations.

* * * * *